Oct. 31, 1967   E. E. REYNOLDS   3,350,006
CALCULATING MACHINE

Filed Feb. 14, 1966   8 Sheets-Sheet 1

INVENTOR.
EUGENE E. REYNOLDS
BY

Oct. 31, 1967 E. E. REYNOLDS 3,350,006
CALCULATING MACHINE
Filed Feb. 14, 1966 8 Sheets-Sheet 2
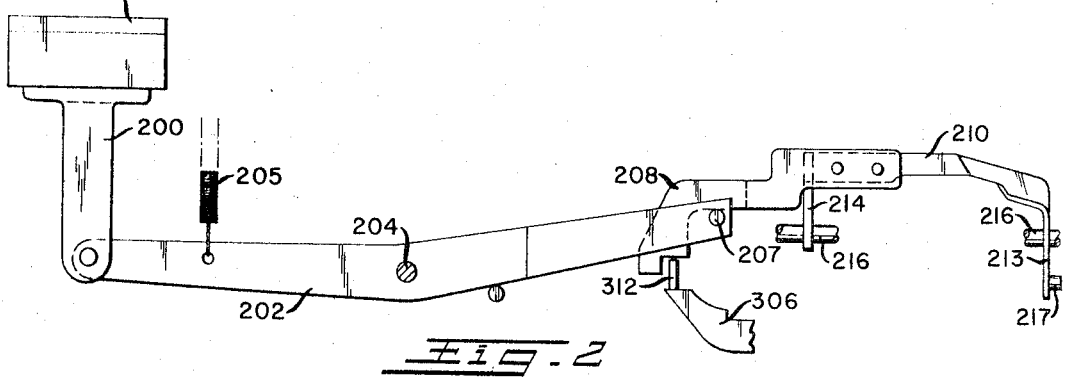
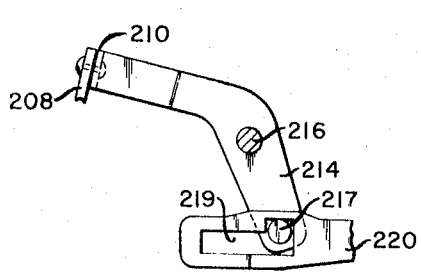
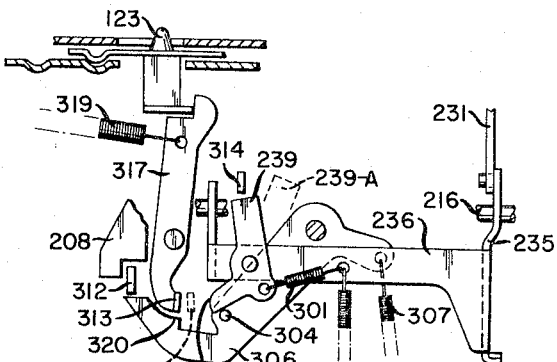
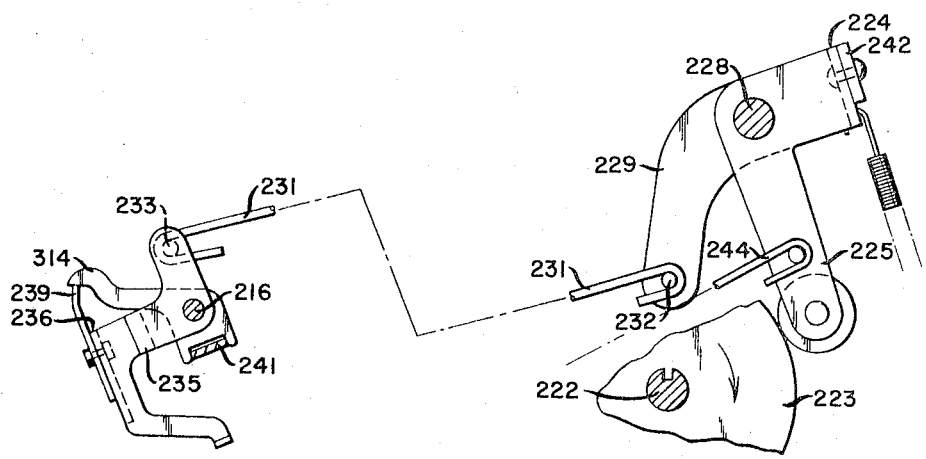
INVENTOR.
EUGENE E. REYNOLDS
BY

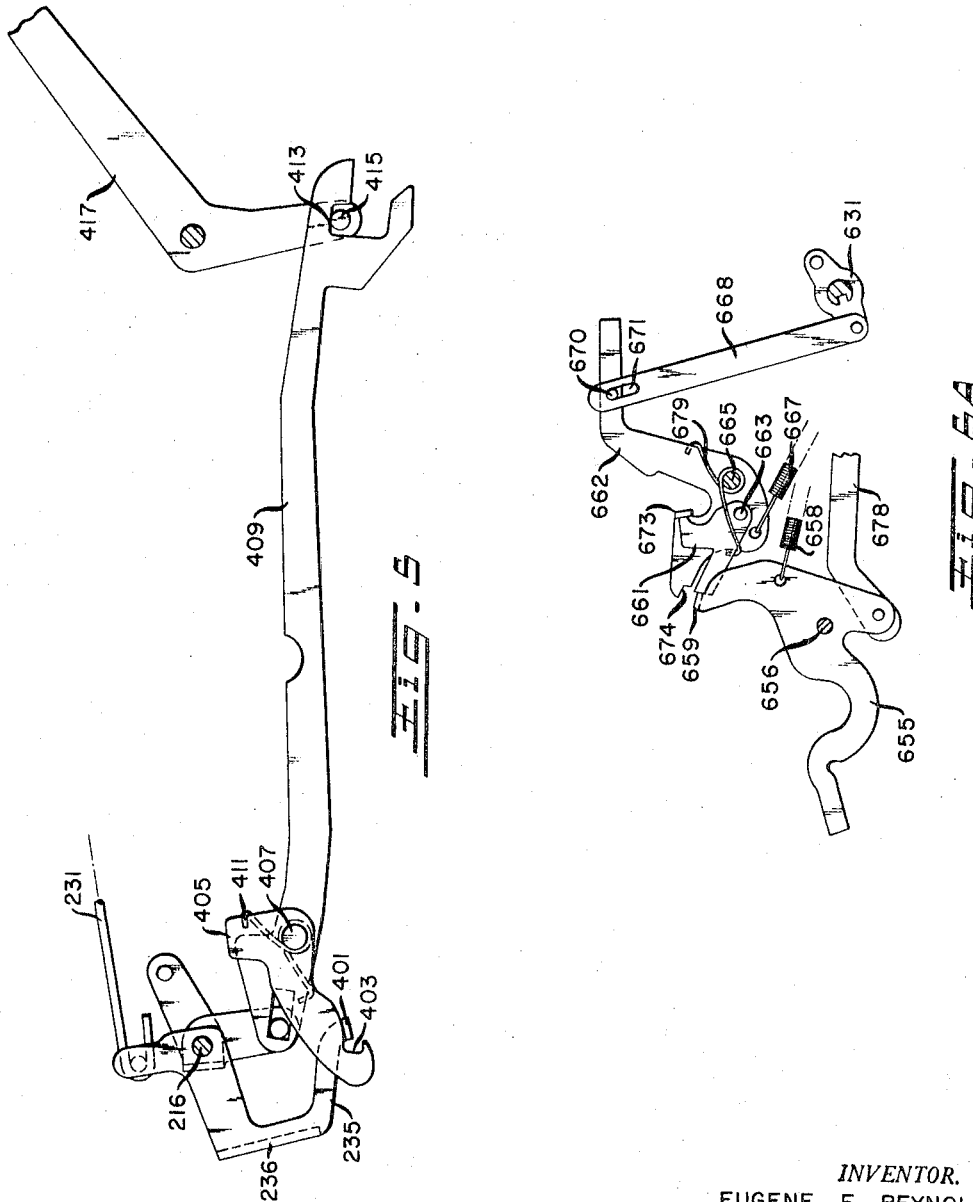

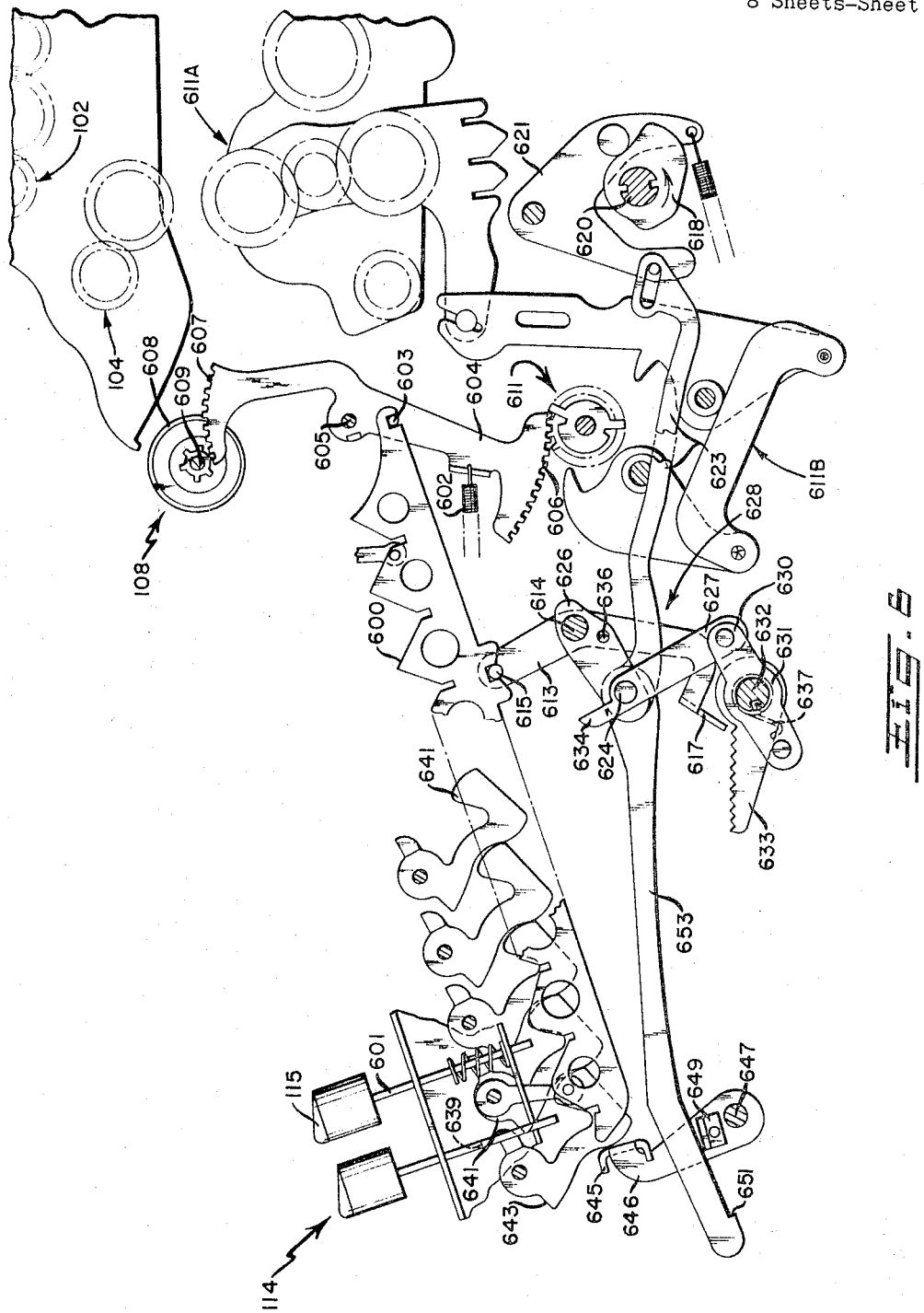

INVENTOR.
EUGENE E. REYNOLDS
BY

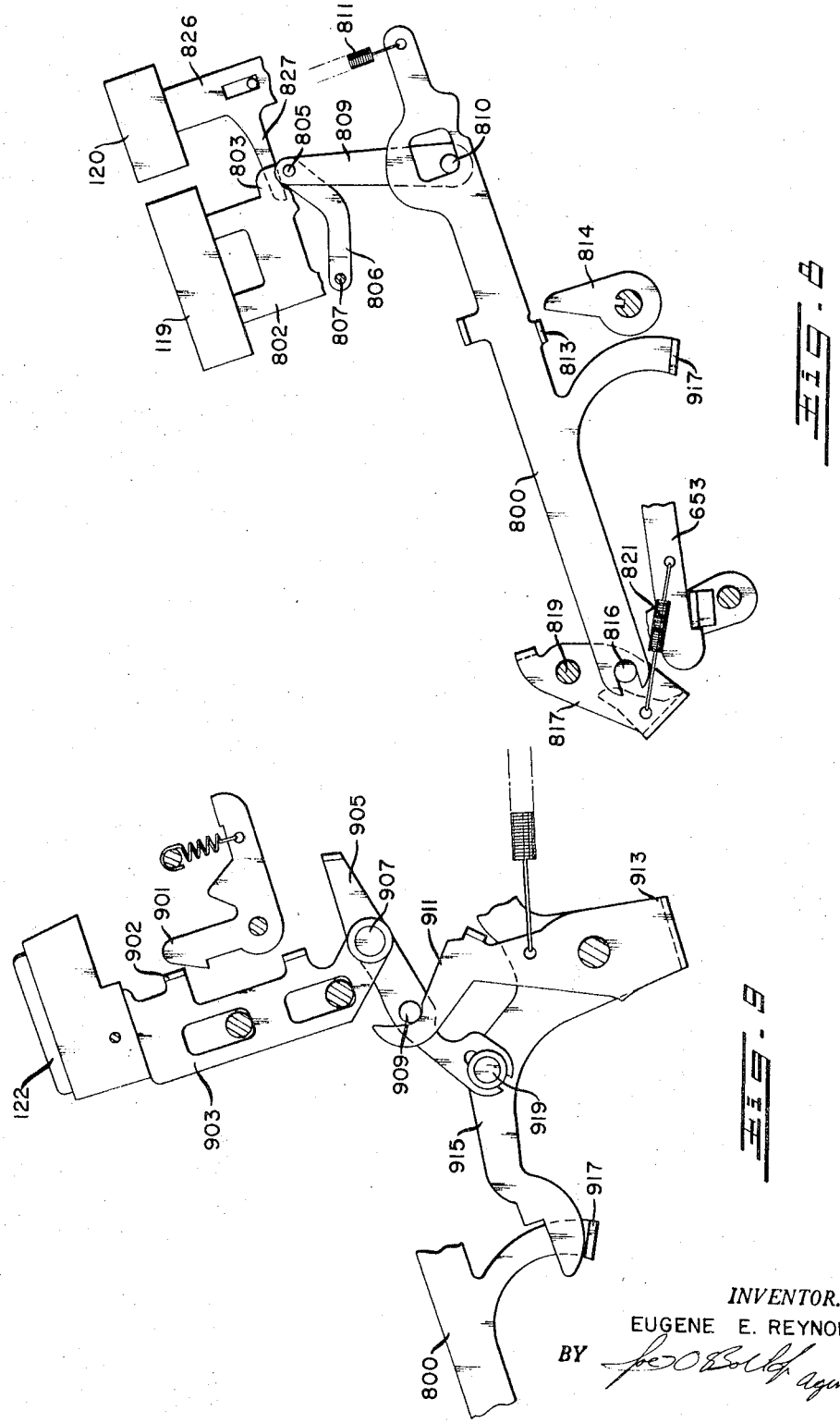

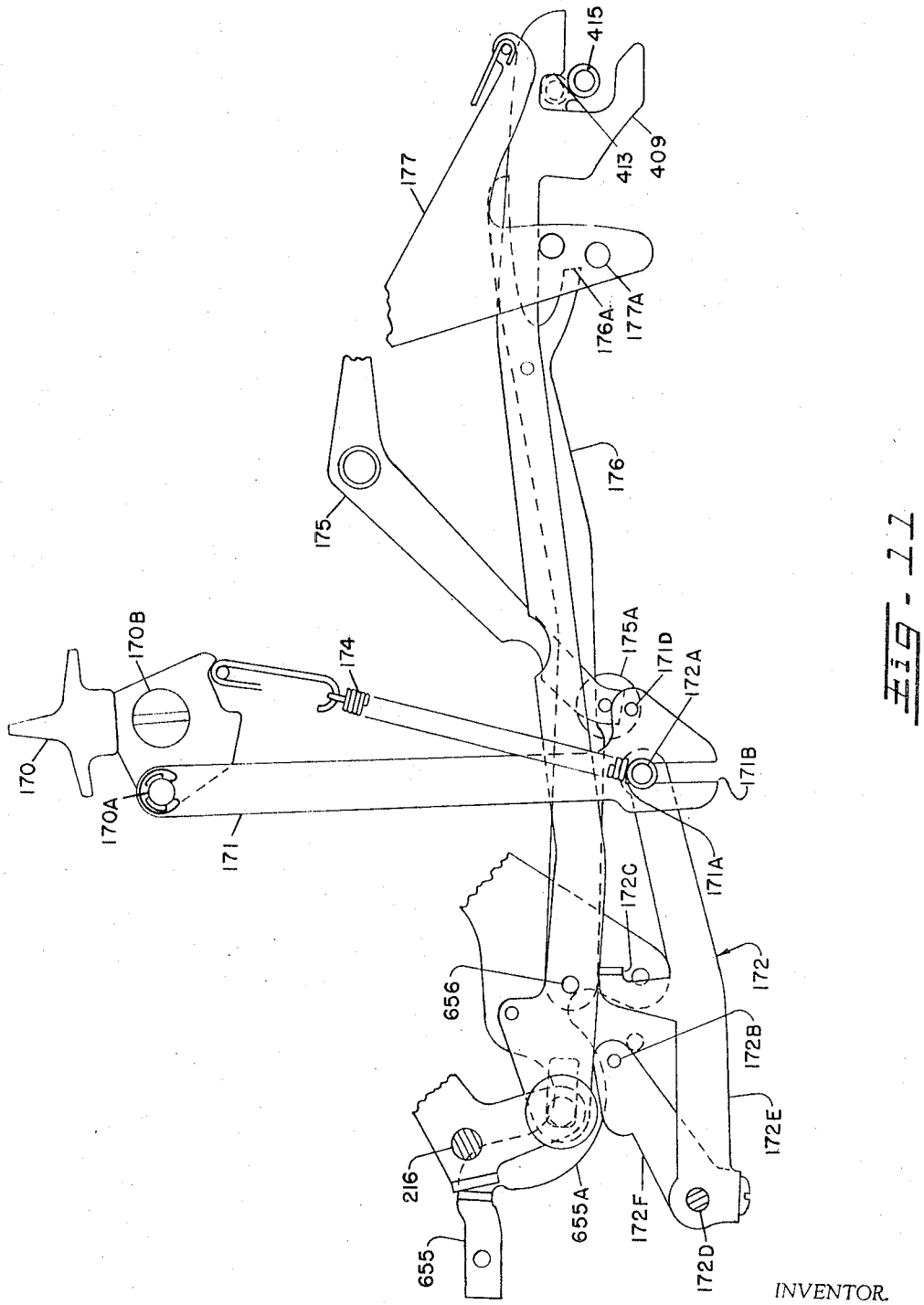

United States Patent Office 3,350,006
Patented Oct. 31, 1967

3,350,006
CALCULATING MACHINE
Eugene E. Reynolds, Orangeburg, S.C., assignor to SCM Corporation, New York, N.Y., a corporation of New York
Filed Feb. 14, 1966, Ser. No. 527,023
17 Claims. (Cl. 235—63)

ABSTRACT OF THE DISCLOSURE

The disclosure relates to calculating machines and more particularly concerns a plural cycle calculating function such as division or multiplication. Normally, following a plural cycle calculating operation, the result register is reset to zero and shifted to a predetermined position relative to the numeral wheel actuators by the depression of a clear return key and in the present case a means is provided for automatically performing the above mentioned clear and shift function by the subsequent depression of a keyboard value key. Thus, the resetting and return shifting functions are initiated as a result of entry of a first factor of a new calculation. Further, this disclosure relates to a calculating machine having a first keyboard for entry of a multiplicand value into the machine and a second keyboard for entry of a multiplier value into the machine and as a result of the above mentioned automatic reset and shift function, a two-step multiplication operation can be performed.

---

The U.S. Patent No. 2,294,948, issued Sept. 8, 1942, to H. T. Avery, discloses a calculating machine comprising a plural order keyboard, keyboard check dials and two result registers in a shiftable carriage. The arrangement is such that the first value key depressed following any arithmetic operation (addition, subtraction, multiplication, division) may selectively cause various automatic operations including clearance of the keyboard, the keyboard check dials, the two registers, and tabulation of the carriage to a predetermined position. Three individual conditioning levers are provided, however, one for each of the two registers and one for the keyboard. A master conditioning lever also is provided for collectively conditioning the individual levers and this master lever must be moved to an active position before the individual levers become effective. When the master conditioning lever and each of the individual levers is moved to an effective position, the machine is conditioned for clearance of each of the registers, the check dials and the keyboard upon depression of the first raised value key following any arithmetic operation. Alternatively, selective positioning of the individual selection levers provides for selective clearances and tabulation upon depression of the first value key.

There are, however, several disadvantages in using the patented arrangement. First, in order to perform addition or subtraction problems, the conditioning levers associated with the result registers must be manually moved to ineffective positions to permit successive values to be registered therein. Otherwise, the registers in which the sum is accumulated would be cleared upon depression of the first value key when entering each new addend or subtrahend.

In the present invention, the first value key depressed is effective to cause the automatic operation only after a multiplication or division operation. The mechanism for carrying out the automatic operations is automatically disabled during addition and subtraction problems. Consequently, the machine may successively be used for multiplication or division and then addition or subtraction and vice versa without manipulation of conditioning levers.

A second disadvantage of the patented arrangement is the inability to automatically clear the keyboard of the last factor entered therein. It is a requirement of the patented machine that a keyboard clearance key be manually depressed to clear the keyboard; alternatively, the first value key depressed in entering the next factor will clear the previous setting of the keyboard. This is true because the value keys depressed for the preceding operation are still in the depressed position prior to depression of the first key for the new operation. It is necessary, therefore, to clear the keyboard by some means other than depression of a value key if the first value key to be depressed for the new value is locked in depressed position by virtue of it having been used in the preceding operation. In such case clearance may be achieved by depression of the keyboard clearance key prior to depression of the first value key.

In the present invention, the keyboard is completely cleared upon initiation of a multiplication or division operation; however, the factor last entered by means of the keyboard is locked in a value entry means throughout the ensuing operation. Thus, all the value keys stand raised at the end of the operation so that any value key may be the first key depressed to initiate the automatic clearance and shifting operations.

A third disadvantage of the Avery arrangement is the number of control keys that must be depressed in order to accumulate the products of successive multiplication problems or to accumulate the quotients of successive division problems, followed by clearance of the registers to permit another such series of accumulations. In the Avery arrangement it is necessary first to disable the registers from automatic clearance. This may be done by appropriate setting of the conditioning levers. With the automatic clearance disabled, it is then necessary at the conclusion of an accumulation of products or quotients to clear the registers by depression of respective register clear keys prior to a new series of accumulations.

In the present invention, individual selective clear conditioning slides are provided for each register to selectively enable and disable automatic clearance of respective registers upon depression of the first value key following only a multiplication or division operation. Movement of these slides to disabling positions permits successive accumulation of quotients or products without clearance of respective registers. In order to reduce register clearances and carriage tabulation to a single step under these conditions, a special clear return key is also provided. Depression of the automatic clear return key initiates clearance of the registers and tabulation of the carriage before each new series of accumulations of products or quotients. Thus, clearance of the registers and tabulation of the carriage may be accomplished by a single key depression, when the individual selective clear conditioning slides are disabled for successive accumulations.

Although the present invention is disclosed as embodied in a mechanical calculating machine, it is envisioned that certain aspects of the invention may be embodied in other environments, as for example, an electronic calculator.

Accordingly, it is the general object of the invention to simplify the operating controls of a calculating machine.

Another object is to minimize the manual steps required between successive problems performed on a calculating machine.

Another object is to automatically carry out predetermined operations on a calculating machine upon depression of the first one of any of the value keys.

Another object is to automatically clear the registers and tabulate the carriage of a calculating machine upon depression of the first one of any of the value keys following a multiplication or division problem.

Another object is to invariably perform a series of multiplication problems in two steps for each problem: step 1—enter multiplicand in keyboard; step 2—enter multiplier in multiplier row.

Another object is to automatically clear the keyboard of a calculating machine upon initiation of any arithmetic operation while retaining the last factor entered at the keyboard in a value entry means.

Another object is to automatically condition a calculating machine during a plural step operation so that upon depression of the first value key following the plural step arithmetic operation the registers are cleared and adjusted relative to the value keys, while upon initiation of a single step operation, the machine is not so conditioned.

Other objects and advantages will appear from the following description in which:

FIGURE 2 is a front view of a clear return key and associated mechanism.

FIGURE 2A is a right side view of a portion of the mechanism shown in FIGURE 2.

FIGURE 3 is a right side view of a mechanism which is operable following a multiplication or division operation to automatically initiate clearance of the middle dials upon depression of a value key.

FIGURE 4 is a front view of a selective middle dial clearance conditioning slide and associated mechanism for enabling and disabling automatic clearance of the middle dials.

FIGURE 5 is a right side view of mechanism for automatically initiating clearance of the upper dials.

Figure 6B:
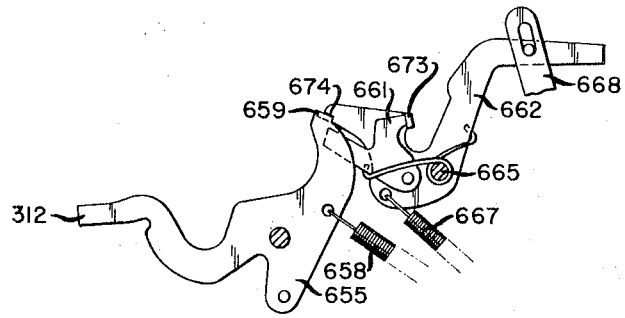
FIGURE 6 is a right side view of mechanism for automatically locking values in value selection bars and check dials during multiplication and division problems and for unlocking the selection bars and check dials upon depression of the first value key following a multiplication or division problem.
Figure 6C:
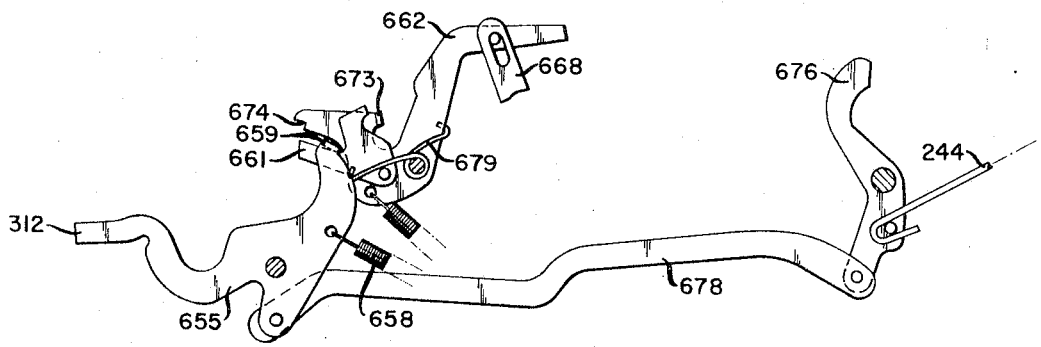

FIGURES 6A, 6B, and 6C show successive positions of a lever which is used to initiate automotic clearance and tabulation.

Figure 7:
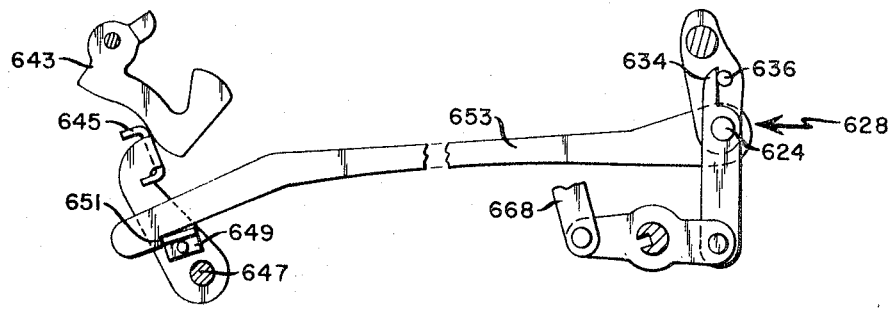

FIGURE 7 is a right side view of a portion of the mechanism of FIGURE 6 shown in an operated position following a multiplication or division operation.

FIGURE 8 is a right side view of mechanism operated in connection with the add and subtract bars for moving the mechanism of FIGURE 7 to the position shown in FIGURE 6 to prevent values from being locked in the selection bars and check dials during addition and subtraction.

FIGURE 9 is a right side view of a multiplier non-shift key and associated mechanism.

Figure 10:
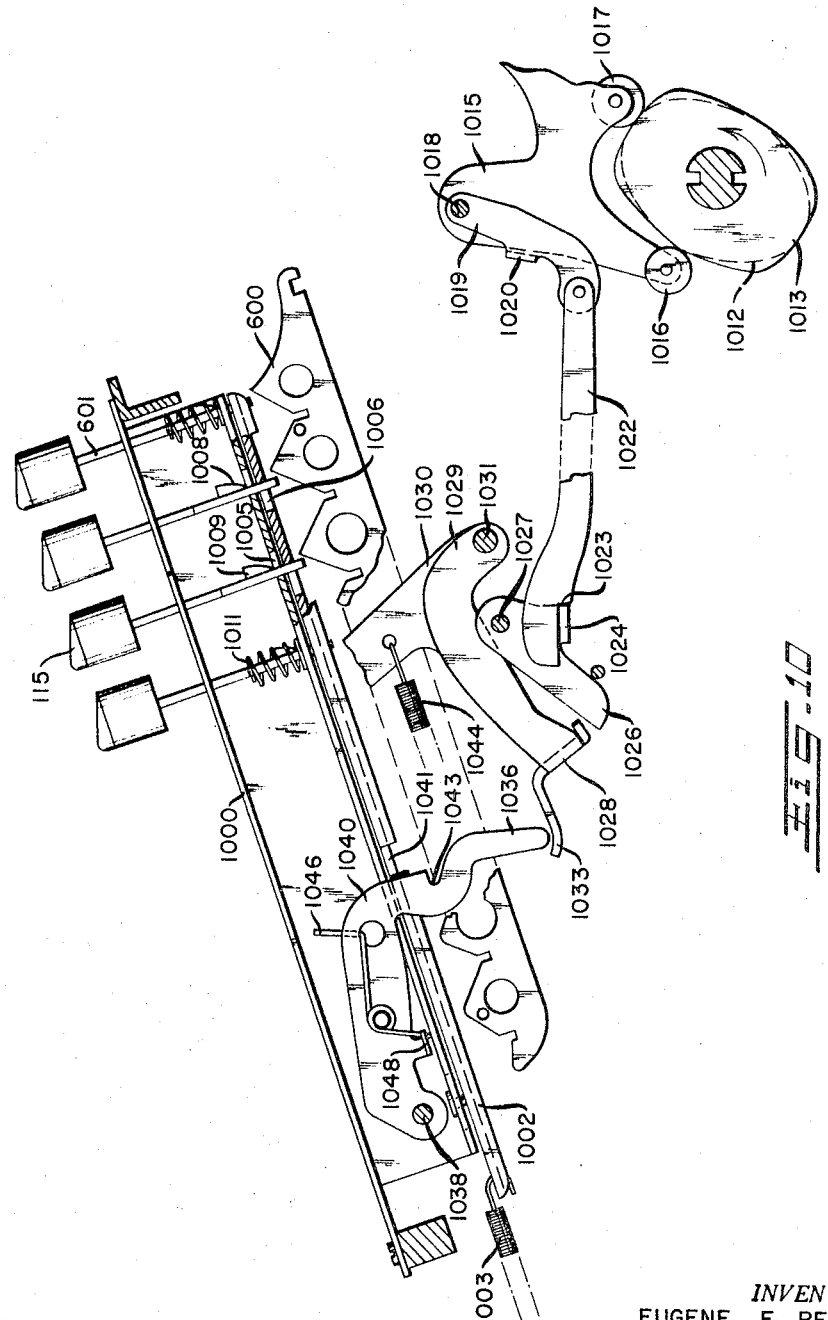

FIGURE 10 is a right side view of the mechanism for effecting clearance of the keyboard during addition, subtraction, multiplication and division.

FIGURE 11 is a right side view of a selective upper dial clearance conditioning lever and associated mechanism for enabling and disabling automatic clearance of the upper dials.

Figure 1:
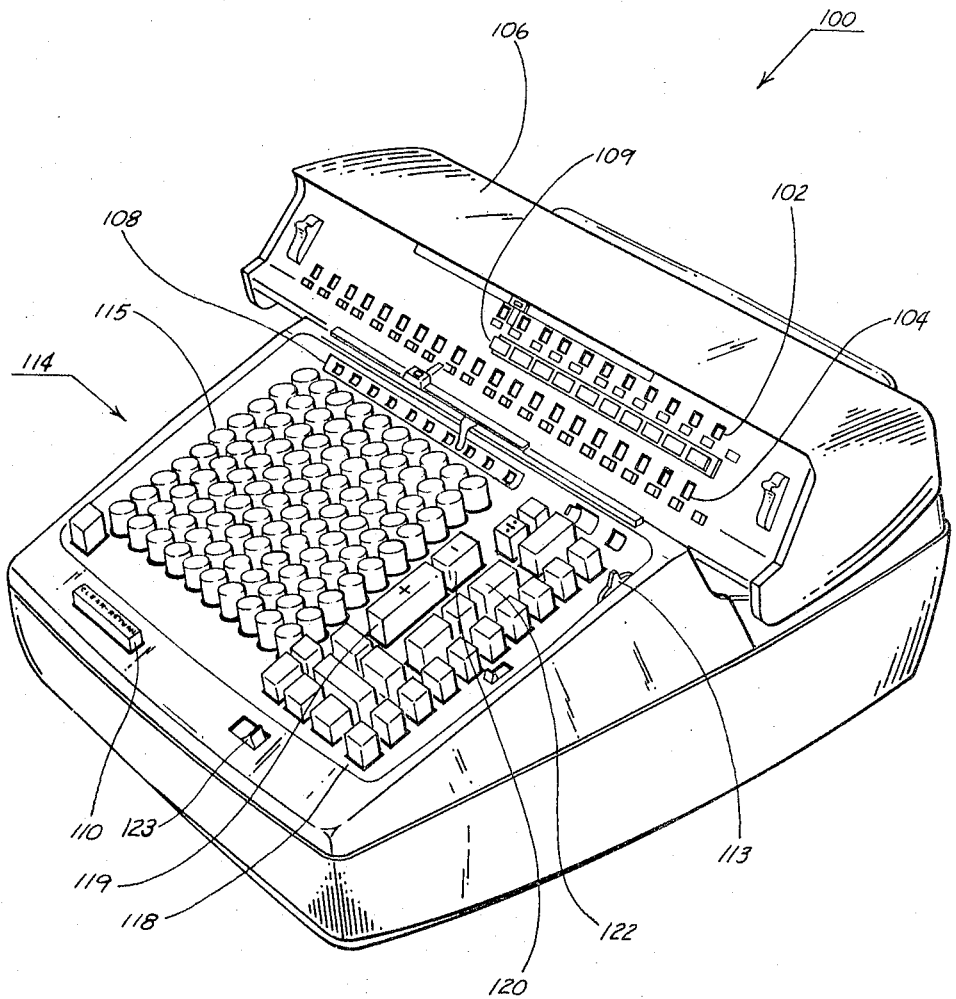
FIGURE 1 is a right front perspective view of a calculating machine in which the present invention is embodied.

The invention is embodied in a calculating machine 100 (FIGURE 1) which comprises registers including upper dials 102 and middle dials 104 mounted in a shiftable carriage 106, tab set keys 109 for preselecting the position to which the carriage will be shifted, and keyboard check dials 108 for registering values entered in keyboard value keys 115. This invention is an improvement of a basic calculating machine which is described in U.S. Patent No. 2,271,240, issued on Jan. 27, 1942, to H. T. Avery, which basic machine is shown in a similar but more advanced form in a commercially known SCM calculating machine disclosed in an SCM Service Instruction Manual entitled "Model Consolidation (Model CMF, CM, CDF, CD)," published by Smith-Corona Marchant Inc., and copyrighted in the United States in 1962, Copyright Registration No. AA 592421.

*Clear return key*

A clear return key 110 (FIGURE 1) is provided on the calculating machine 100. Depression of the key 110 initiates clearance of both the upper dials 102 and the middle dials 104 and causes shifting or tabulation of the carriage 106 to a position preselected by depression of one of the tab set keys 109.

The above operation is initiated by means of mechanism shown in FIGURE 2 wherein depression of the clear return key 110 drives a depending keystem 200 downward. The keystem 200 is connected to the left end of a lever 202 which is pivoted at 204 and clockwise urged (CW) by a spring 205. Upon downward movement of the keystem 200, the lever 202 is driven counterclockwise (CCW). A stud 207 extends from the right end of lever 202 to a position beneath an extension 208 which is suitably fastened to a master clutch opening bail 210. The bail 210 comprises right and left arms 213 and 214 which are pivoted on a frame shaft 216. Thus, the bail 210 is rocked CW (FIGURE 2A) by the above described means when the clear return key 110 is depressed. A stud 217 extends from the right arm 213 into engagement with an L-shaped slot 219 in the left end of a link 220. The right end of the link 220 is connected through linkages (not shown) to cause engagement of a standard carriage return clutch described in the aforementioned manual and shown at FIG. 83 thereof.

*Middle dial clearance*

When engaged, the carriage return clutch drives a shaft 222 (FIGURE 3) CW. A cam 223 keyed to the shaft is carried CW therewith, driving a bail 224 and follower arm 225 extending therefrom CCW about a frame shaft 228. A second arm 229 is rocked CCW with the bail, moving rightward a link 231 which is connected to a pin 232 extending from the arm. The left end of the link 231 is connected to a pin 233 extending from an arm 235 of a bail 236, the arm 235 being pivoted on the shaft 216. A lever 239 is pivotally mounted on the front of the bail 236 and is carried CW with the bail.

The lever 239 is also shown in the normal position in FIGURE 4. A spring 301 is mounted between the lever 239 and bail 236 to urge the lever CCW, bringing a live tip 303, which extends from the lever, into engagement with a stud 304 on a lever 306. The lever 306 is pivoted on a frame shaft and is urged CW by a spring 307, to the extent permitted by a blocking tail 312 or ear 313.

Consequently, when the bail 236 is rocked CW (FIGURE 3) or upwardly (FIGURE 4), the lever 239 is driven against a lever 314 (FIGURES 3 and 4) mounted on the shaft 216. A notch in the lower end of the lever 314 is engaged with a bail 241 and is driven CW with the lever. When the bail 241 is rocked CW, the middle dials 104 are cleared by means of standard mechanism shown and described in the aforementioned manual at page 129, FIGURE 159 thereof.

*Upper dial clearance*

Clearance of the upper dials 102 (FIGURE 1) may be carried out upon depression of the clear return key 110 by mechanism shown in FIGURE 5. As previously discussed, depression of the clear return key engages a carriage return clutch which causes the link 231 to be moved rightward to rock bail 236 CW. An ear 401 extending therefrom is driven CW into engagement with a notch 403 of a latch 405. Latch 405 is pivoted at 407 to a link 409 and is urged CCW about the pivot by a torsion spring 411. The latch 405 and link 409 are moved forward upon engagement of the ear 401 with the notch 403. A notch 413 in the right end of link 409 is engaged with a stud 415 on a lever 417. Thus, upon engagement of the carriage return clutch, the lever 417 may be rocked CW through the above described linkages. Clockwise rocking of the lever 417 causes clearance of the upper dials 102 by standard mechanism disclosed in the aforementioned manual at page 43 thereof.

Tabulation

Tabulation of the carriage 106 to a pre-determined position is initiated by depression of the clear return key 110. Upon engagement of the carriage return clutch as a result of depressing key 110, the bail 224 (FIGURE 3) is rocked CCW in the manner discussed hereinbefore. An extension 242 is rocked CCW therewith, causing actuation of standard tabulation mechanism to tabulate the carriage 106 to the preset position. The tabulation mechanism actuated by the bail 224 is shown and described in the aforementioned manual at page 74 (FIG. 83).

Value entry locking mechanism

The calculating machine 100 (FIGURE 1) includes a full keyboard 114 with ordinal keybanks comprising value keys 115. A portion of the details of a single keybank according to the invention is illustrated in FIGURE 6. A value entry means comprising a differential selection bar 600 is movably mounted beneath each keybank. When a value key 115 is depressed, a depending keystem 601 is lowered against a corresponding camming surface of the associated selection bar 600, driving the bar rightward a distance proportional to the value of the depressed key. A swinging segment member 604 is mounted upon a common shaft 605 which supports like members associated with other keybanks and is connected at 603 to the associated selection bar 600. Each bar 600 is urged leftward and each member 604 urged CW by means of a spring 602. Each member 604 is provided at opposite ends with arcuate gear segments 606 and 607. The segment 607 serves to transmit movement of the selection bar 600 to a check dial assembly 108. The assembly 108 comprises ordinal dials 608 pivotally mounted on a shaft 609 in alignment with similar dials associated with the other keybanks to enable reading of a value set up on the keyboard in a straight line. Each movement of a bar 600 is transmitted also to a respective cam unit 611 by means of the segment 606. Each cam unit is positioned to form a mechanical representation of the number set up on the keyboard whereby numeral wheel actuators 611A which are selectively operable for a single or a plurality of cycles of actuation and which are under control of cam unit 611 through linkage 611B to transfer a value contained in cam unit 611 to the result register including upper and middle dials, respectively in such a manner that the calculating mechanism may be accordingly controlled as set forth in the aforementioned Avery Patent No. 2,271,240.

A selection interponent 613, is mounted on a shaft 614 and is connected to each bar 600 by means of a stud 615 engaging a slot in the bar. The interponent is rocked CW upon rightward movement of the bar. A shelf 617 extending from each interponent 613 is located in a position 0-9 corresponding to the value of the key depressed in the associated order. Following entry of an entire value into the keyboard 114 and the consequent positioning of respective interponents 613 and setting of check dials 108, depression of a control key, e.g., the plus key, the minus key, the divide key or multiply key, initiates the operation of a setting clutch such as shown and described in the aforementioned manual at page 15 (FIG. 18). The setting clutch performs several operations preparatory to carrying out the type of calculation selected by the operator.

Multiplication and division

Assuming that the control key depressed is either a divide key 117 or one of the keys 118 in the mutiplier row then the setting clutch is engaged and rotates a shaft and a cam 618 fixed thereon CCW. A follower 621 is driven CCW by the cam and a link 623 connected by means of a pin and slot to the follower is driven rightward thereby. The left end of the link 623 is connected to a movable pivot 624 to which a pair of links 626 and 627 are also connected. The links 626 and 627 form a toggle generally indicated at 628. The upper end of link 626 is mounted on the frame shaft 614 while the lower end of the link 627 is connected to an arm 630 of a lever 631. The lever 631 is keyed to one end of a shaft 632 on which a group of ordinal selection locks 633 also are mounted. A step cam or lock 633 having ten steps is provided for each shelf 617 to lock the shelf and corresponding bar 600 in the position to which it is set by a value key. Upon rightward movement of the link 623, the links 626 and 627 are moved rightward therewith until blocked by engagement of a tail 634 with a stud 636 on the arm 626, as shown in FIGURE 7. The lever 631 and shaft 632 are rocked CW thereby causing the locks 633 to be driven against respective shelves 617. The shaft 632 must be rocked far enough CW to permit possible engagement of the leftmost step of the interponent 613 with the shelf 617 when it is rocked to a "nine" representing position. Thus, in order to hold all of the locks 633 firmly against respective shelves, the keyway in shaft 632 is made larger than the keys of respective locks 633. A spring 637 is mounted adjacent each lock, between the lock and the keyway, for urging the lock CW. When the lever 631 is fully CW, the springs 637 hold the interponents against respective shelves regardless of the differential positions in which the interponents are blocked. The value representing positions to which the value selection bars 600 and check dials 108 were previously set are locked thereby in the set positions.

Thus, during a multiplication or division operation, the toggle 628 is set to the position shown in FIGURE 7. The toggle remains in this position throughout the operation and is in this position at the end of the operation. With the selection bars locked in value representing positions, during multiplication and division, the keyboard is cleared by means discussed hereinafter. Consequently, at the end of a multiplication or division operation, all of the keys of the keyboard are in raised positions, and the selection bars are in their respective locked positions.

A feature of the invention is that depression of the first one of any of the value keys, which are all in raised positions following a multiplication or division operation, causes release of the selection bars to enable entry of a new value. Depression of the first value key after a multiplication or division problem, forces a depending keystem 601 downwardly and drives a shoulder on the keystem 639 onto an associated bellcrank lever 641 mounted beneath the value keys 115 for cooperation therewith. The primary function of the levers 641 is to prevent the depression of more than one key at any one time. The manner in which this is accomplished is set forth in U.S. Patent No. 2,583,377, issued to G. K. Hurni on Jan. 22, 1952, to which reference is made for a full disclosure thereof. In the present invention an additional bellcrank lever 643 is mounted in each order to the left of the #1 keystem and cooperates with the other bellcranks in the normal manner. As disclosed in the Hurni patent, depression of a value key drives a depending keystem 601 against two bellcrank levers, causing the levers that are rearward (to the right) of the depressed key to be rocked CCW, while causing those forward (to the left) of the depressed key to be rocked CW. Since there are no value keys forward of the lever 643, the lever 643 invariably is rocked CW when any of the value keys 1–9 is depressed.

A bail 645 extends transversely across the front of the machine for cooperation with each of the levers 643. An arm 646, one of two similar arms, extends from the bail 645 and is freely mounted on a shaft 647. A shelf 649 is fixed on the arm 646 for engagement with a shoulder 651 in the left end of a link 653. The right end of the link is connected to the pivot 624 of the toggle 628. At the end of a multiplication or division operation, the toggle remains in the position shown in FIGURE 7. Consequently, the link 653 also will be in the position shown in FIGURE 7, with the notch 651 engaged with the shelf 649. When the first value key is depressed in beginning the next calculation, the lever 643 is driven CW, and the bail 645 is driven CCW, causing the shelf 649 to restore the link 653 leftward and return the toggle 628 from the position shown in FIGURE 7 to the position shown in FIGURE 6. The lever 631 and shaft 632 are thereby rocked CCW to permit the locks 633 to disengage from the shelves 617. The check dials 108 and selection bars 600 underlying all of the rows of keys except the one being depressed are enabled to return to the normal positions shown in FIGURE 6 under the urging of spring 602. With the locks 633 clear of the shelves 617, the selection bars 600 are free to move to new value representing positions and to thereafter again be locked in value representing positions upon initiation of a multiplication or division operaton, as discussed previously.

*Automatic operations*

Another feature of the invention is that depression of the first one of any of the value keys following a multiplication or division operation initiates automatic clearance of the upper and middle dials and tabulation of the carriage as well as clearance of the value keys discussed above. Mechanism for achieving such clearances and tabulation is shown in FIGURE 6A wherein an automatic lever 655 is rotatably mounted on a frame shaft 656. The lever 655 is urged CW by a spring 658 but normally is held in the position shown by means of a live point 661 which blocks an ear 659 extending from the lever 655. The live point is pivotally mounted at 663 on a bellcrank 662. The bellcrank 662 is rotatably mounted on a frame shaft 665 and is urged CCW thereabout by a spring 667. The bellcrank 662 normally is held in the position shown against the urging of the spring 667 by a link 668 connecting the bellcrank and the lever 631 (FIGURES 6 and 6A). The link 668 is maintained in the position shown in FIGURE 6A by the toggle 628 being in the normal position shown in FIGURE 6. The position of the toggle 628, however, at the end of a multiplication or division operation is that shown in FIGURE 7. Consequently, the link 668 is moved upward to permit a stud 670 that extends from the bellcrank 662 to move freely in a slot 671 in the link 668. The bellcrank is free thereby to rock CCW under the urging of the spring 667 to the position shown in FIGURE 6B. An upper arm of the live point 661 is forced by an ear 673 to rock CCW with the bellcrank. The live point 661 is carried thereby out of engagement with the ear 659 and the latter moves into engagement with a shoulder 674 in the bellcrank.

The bellcrank 662 and automatic lever 655 are in the positions shown in FIGURE 6B at the end of a multiplication or division operation and remain in these positions until depression of the first value key or another control key.

Upon depression of the first value key following a multiplication or division operation, the toggle 628 is moved from the position shown in FIGURE 7 to that shown in FIGURE 6 in the manner previously discussed. The link 668 is moved downward from the position shown in FIGURES 6B and 7 to the position shown in FIGURE 6C, rocking the bellcrank 662 CW to the position shown in FIGURE 6C. This action causes the shoulder 674 to disengage the ear 659 and the live point 661 to be driven against the ear 659. With the ear 659 disengaged from the shoulder 674, the lever 655 is free to rock CW under the urging of spring 658 to the position shown in FIGURE 6C.

The blocking tail 312 is rocked CW with the lever 655 or upwards in FIGURE 2. When rocked upwards, the tail 312 is driven against the extension 208, causing the extension and bail 210 to be driven upwards or CW in FIGURE 2A. Such rocking of the bail 210 initiates middle and upper dial clearances in the manner discussed hereinbefore in the "Clear Return Key" section.

Depression of the first one of any of the value keys, therefore, following a multiplication or division operation, causes clearance of the selection bars 600, the check dials 108, the upper dials 102 and the middle dials 104, and also tabulation of the carriage 106.

To initiate the above clearances and tabulation, the carriage return clutch is activated to drive the cam 223 (FIGURE 3) in the manner discussed hereinbefore. The follower 225 is driven CCW thereby, pulling a wire link 244 (FIGURES 3 and 6C) rightward. The link 244 is connected to a lever 676 which is rocked CCW about a frame shaft by the link. A link 678 is connected between the lever 676 and automatic lever 655 so that the lever 655 is returned CCW to the position shown in FIGURE 6A each time the carriage return clutch drives the cam 223. Since the toggle 628 is moved to the position shown in FIGURE 6 upon depression of the first value key, the link 668 is in a lowered position. Consequently, the bellcrank 662 is in the CW position with the shoulder 674 clear of the ear 659. When the lever 655 is rocked CCW by the link 678, the live point 661 is snapped into engagement with the ear 673 by a spring 679 between the bellcranks 662 and live point. The live point 661 is thereby positioned in front of the ear 659 to block the automatic lever 655 in the position shown in FIGURE 6A at the conclusion of the carriage return clutch cycle.

*Addition and subtraction*

A feature of the invention is provision for automatically locking the selection bars in value representing positions upon initiation of a multiplication or division operation and for preventing such locking during an addition or subtraction operation. The locking and prevention of locking is accomplished automatically without manipulation of keys other than the add and subtract control keys for such operations. The locking of the selection bars during multiplication and division has been discussed previously. Mechanism for preventing such locking is shown in FIGURE 8. Depression of either an add bar 119, a subtract bar 120 or a multiplier non-shift key 122 FIGURE 9 causes a keyboard clear link 800 to be lowered and thereby positioned to move the toggle 628 from the position shown in FIGURE 7 to the position shown in FIGURE 6.

Depression of the add bar 119 moves a depending frame 802 downward. A projection 803 of the frame overlies a pin 805 and drives the pin downward. The pin is guided by a member 806 which is pivoted to a stationary shaft 807. A member 809, also connected to the pin and guided by the member 806 is driven downward therewith. A pin 810 extends from the member 809 and is engaged in a slot in the right end of the link 800. The pin 810 normally prevents the link from rising under the urging of a spring 811. As a result of depression of the add bar 119, an ear 813 on the link 800 is lowered into the path of a lever 814. As disclosed in the aforementioned Avery Patent, 2,271,240, depression of the add bar 119 causes power operation of the machine during which the lever 814 is driven first CCW and then CW. The keyboard clear link 800 is driven leftward thereby during an add cycle by means of the lever 814 and ear 813. A slot in the left end of the link is engaged with a stud 816 extending from a member 817, which member is freely mounted on a frame shaft 819. A spring is connected between the member 817 and the link 653 thus urging link 653 towards the left. The spring 821 elongates as long as the toggle 628 is held rightward by the link 623 and cam 618 (FIGURE 6). When the cam presents a low surface to the follower 621, the spring 821 (FIGURE 8) pulls the links 623 and 653, and the toggle 628 leftward. The step cams 633 are thus rocked CCW to prevent latching of the shelves 617. Under these conditions, the selection bars 600 are held only by respective keystems so that when the keystems are released during keyboard clearance, as presently described, the bars 600 and check dials 608 are free to return to their normal zeorized position.

In a similar manner, depression of the subtract bar 120 also prevents a value from being locked in the check dials. Depression of the subtract bar 120 lowers a depending stem 826, causing a projection 827 to drive the pin 805 downward to lower the link 800 and ear 813. During the ensuing subtraction operation, the lever 814 is rocked CCW as during addition, causing the step cams 633 (FIGURE 6) to be rocked clear of the shelves 617.

Depression of the multiplier non-shift key 122 (FIGURES 1 and 9) also causes lowering of the link 800 and consequent release of the toggle 628 to permit restoring the bars 600 to zero representing positions during each machine cycle. The non-shift key 122 is not a live key and is used selectively to prevent shifting of the carriage during multiplication. The key 122 is latched down by engagement of a latch 901 with an ear 902 of a depending keystem 903. This results in the ear 813 (FIGURE 8) being continuously positioned in front of the lever 814 as follows. The linkage for lowering the link 800 as a result of depression of the non-shift key 122 comprises a lever 905 pivotally connected to the keystem 903 at 907. A stud 909 extends from the lever 905 into engagement with a right arm 911 of a bail 913. A left arm 915 of the bail overlies an ear 917 on an arm extending from the link 800. The lever 905 is pivoted on the arm 915 at 919 as well as to the keystem at 907. Thus, depression of the non-shift key 122 drives the keystem 903 downward and moves the lever 905 CW about the pivot 907. The stud 909 that extends from the lever 905 is driven against the right arm 911 of the bail 913, camming the arm 911, bail 913 and left arm 915 CCW. This action causes the left end of the arm 915 to be driven against the ear 917 to lower the link 800. The link 800 remains lowered as long as the non-shift key 122 is latched downward.

*Value key clearance*

A feature of the invention is that all of the value keys 115 (FIGURE 1) are in raised positions at the end of a multiplication or division operation, as well as at the end of an addition or subtraction. This permits any one of the value keys to be depressed first after a multiplication or division operation. As discussed previously, depression of the first value key following a multiplication or division operation initiates clearance of the check dials 108, clearance of the registers 102 and 109 and tabulation of the carriage 106.

The above feature is obtained by mechanism shown in FIGURE 10 in conjunction with mechanism previously described. All value keys 115 are released from depressed positions during the first of a plurality of actuation cycles in a multiplication or division operation, as well as during addition and subtraction by the mechanism shown in FIGURE 10. Since multiplicand or divisor values set in the keyboard are locked in the check dials 108 and selection bars 600 by the step cams 633, as discussed previously, release of the value keys 115 during the first actuation cycle will not affect the performance of multiplication or division problems which require mechanical representation of the values throughout the problem.

The structure provided in FIGURE 10 includes a framework 1000 in each ordinal position. The keystem 601 depending from the value keys are mounted in respective frameworks for vertical movement. A slidable member 1002 is mounted beneath each ordinal framework 1000 and is slidable with respect thereto. A spring 1003 urges each slidable member leftward to the normal position in which it is shown. Each of the keystems 601 extends through a slot 1005 in the framework 1000 into engagement with the right edge of a slot 1006 in the slidable member 1002. Upon depression of a value key 115, the lower end of the keystem 601 is driven against an opposing camming surface on the selection bar 600, driving it rightward to a corresponding value representing position. During lowering of the key, a camming lug 1008 on the keystem is driven through the slot 1005 and against the right edge of slot 1006, thereby camming the member 1002 rightward against the urging of the spring 1003. When the keystem 601 is lowered to its fully downward position, the lug 1008 is clear of the slot 1006, permitting the slidable member 1002 to slide leftward over a shoulder 1009 of the extension 1008. The key and keystem are latched thereby in the downward position against the pressure of a spring 1011 which is wound around the keystem. The depressed key may be released for restoration by the spring 1011 to the raised position by moving the slidable member 1002 rightward to release the shoulder 1009.

During the first actuation cycle of either a multiplication, division, addition or subtraction operation, the slidable member 1002 in each order of the keyboard is temporarily cammed rightward to enable all keys 115 to rise. This is accomplished by means including complementary cams 1012 and 1013 mounted for CCW rotation upon actuation of the setting clutch which is engaged during multiplication, division, addition and subtraction, as described in said Patent No. 2,271,240. The cams 1012 and 1013 are driven CCW, forcing a follower 1015 CW about a frame shaft 1018 through engagement with rollers 1016 and 1017.

An arm 1019, also mounted on the frame shaft 1018, has an ear 1020 overlying the follower. The right end of a link 1022 is pivoted to the arm and is driven leftward by the arm whenever the follower 1015 is driven against the ear 1020. A shoulder 1023 in the left end of the link 1022 is engaged with an ear 1024 extending from a lever 1026 which is mounted on a frame shaft 1027. When the link 1022 is driven leftward, the shoulder is driven against the ear, driving the lever 1026 CW. The ear 1024 is of such width that when it is moved CCW and upwardly the left edge thereof cams the link 1022 upwardly and off of the trailing edge of ear 1024. The shoulder 1023 is thus forced out of engagement with the ear to permit the lever 1026 to return CCW to the position shown even though the link 1022 remains in a leftward position. A keyboard clearance bail 1028 has right and left arms 1029 and 1030 which are pivotally mounted on a frame shaft 1031. The bail 1028 is positioned for engagement by the lever 1026 for CW rocking of the bail. The bail 1028 comprises a plurality of ordinarily arranged extensions 1033, each of which extensions underlies a respective ordinal release lever 1036. Each release lever 1036 is pivotally mounted upon the respective ordinal channel frame 1000 at 1038 and has a camming surface 1040 in engagement with an ear 1041 which projects laterally from the slidable member 1002. Whenever the bail 1028 is rocked CW as a result of movement of the cams 1012 and 1013, each extension 1033 engages the corresponding release lever 1036, driving the lever CCW. The camming surface 1040 on the release lever is driven thereby against the ear 1041, moving the member 1002 rightward to release any depressed value key by disengagement of the slot 1006 with the shoulder 1009. When a notch 1043 in the release lever becomes aligned with the ear 1041, the ear snaps into the notch 1043 to hold the release lever in the CCW position. Upon disengagement of the shoulder 1023 with the ear 1024, the bail 1028 and extensions 1033 are returned to the position shown in FIGURE 10 by a spring 1044. Each release lever 1036, however is held in the CCW position by engagement of the notch 1043 with ear 1041 until a value key in the same order is depressed again. Such a depression will move the member 1002 rightward to a position in which the ear 1041 is clear of the notch 1043. The lever 1036 is then released to snap downward to the position shown in FIGURE 10. Such snapping is caused by a torsion spring 1046, having one end connected to an ear 1048 on the release lever and the other end projecting through a hole in the lever. The spring 1046 is compressed through contact of the upper end with the under side of the channel frame 1000. The spring 1046 ensures the prompt return of the release lever 1036 to its initial position when the ear 1041 is moved out of engagement with the notch.

*Middle dial selective clearance conditioning slide*

Another feature of the invention is the provision of a middle dial selective clearance conditioning slide 123 (FIGURES 1 and 4) which enables an operator to disable automatic clearance of the middle dials 102 which would otherwise occur upon depression of the first one of any of the value keys 115 following a multiplication or division operation. This feature permits accumulation of products while retaining the other automatic features discussed previously.

With the slide 123 rightward in the position shown in FIGURE 4, automatic clearance of the middle dial is carried out upon depression of the first value key following a multiplication or division operation. When the lever 123 is moved rightward, a lever 317 is forced CW about a frame shaft against the urging of a spring 319, thereby positioning the ear 313 over a shoulder 320 of the lever 306.

Upon depression of the first value key following a multiplication or division operation the automatic lever 655 (FIGURE 6B) is rocked CW in the manner discussed hereinbefore. The tail 312 (FIGURES 2, 4 and 6C) is driven against the extension 208 to rock the bail 210 CW (FIGURE 2A) to actuate the carriage return clutch. Actuation of the carriage return clutch causes the bail 236 to be rocked CW as shown in FIGURE 3 or upward as shown in FIGURE 4. As the bail 236 is rocked upwardly, the lever 239 is carried therewith to be driven against the lever 314 which rocks bail 241 (FIGURE 3) to initiate clearance of the middle dials in the manner discussed in the aforementioned manual. The lever 239 is maintained in position to be driven against the lever 314 by means of the stud 304 extending from the lever 306. The lever 306 is maintained in the position shown through engagement of the shoulder 320 with the ear 313 when the tail 312 is moved out of engagement with the lever 306.

When the slide 123 is leftward, the ear 313 is in the position 313–A, clear of the shoulder 320. Depression of the first value key following a multiplication or division operation causes the tail 312 to move upward to initiate actuation of the carriage return clutch as before. However, since the ear 313 is clear of the shoulder 320, the lever 306 is free to rock CW under the urging of spring 307. The stud 304 is carried CW by the lever 306 to drive the lever 239 CW to a position 239–A. The end of the lever 339 therefore is clear of the lever 314 so that when the bail 236 is moved upwardly as a result of actuation of the carriage return clutch, the lever 239 is not driven against the lever 314.

Automatic middle dial clearance is thus disabled upon leftward movement of the middle dial selective clearance conditioning slide 123.

*Upper dial selective clearance conditioning lever*

A feature of the invention is the provision of an upper dial selective clearance conditioning lever 170 (FIGURES 1 and 11) which enables an operator to disable automatic clearance of the upper dial, which would occur upon depression of the first one of any of the value keys 115 following a multiplication or division operation. This feature permits accumulation of quotients while retaining the other automatic features discussed previously.

The lever 170 is mounted on the slide frame for shifting about a fixed pivot and can be positioned in either a forward automatic clearance position or a rearward clearance disabling position (with the front of the machine being on the left as seen in FIGURE 11).

The automatic dial clearance has been described herein above on page 8. In order to disable the upper dial clearance, lever 170 (FIGURE 11) is pivoted on the side frame for rotation about a fixed pivot 170B Connected to a forward portion of the lever 170 at 170A is a link 171 which has a blocking surface 171A located at the upper portion of a slot 171B. The slot 171B in the lower end of link 171 is engaged with a stud 172A extending from a lever 172 which is pivotally mounted on a frame shaft 172D. The lever 172 is provided with a first arm 172E and a second arm 172F. A stud 172B extends from the second arm 172F and engages a cam surface 655A on automatic lever 655 (shown in FIGURES 6A, 6B, 6C, and 11). The lever 172 is urged CCW about shaft 172B by means of a spring 174 which is connected at one end to stud 172A and is connected at the other end to a frame shaft.

With the lever 170 in the rearward position as shown in FIGURE 11 and when the automatic clearance lever 655 is rocked CW to cause a tabulation and clearance by the unlatching of the toggle assembly, lever 172 being spring urged upward is now free to rock CCW. As lever 172 is rocked upward an ear 172C, which extends outward from a raised portion of arm 172, will lift link 409 (FIGURES 5 and 11) CCW to remove a notch 413 on the rear of link 409 from around stud 415. Now, when the link 409 is pulled forward by bail 236 (FIGURE 5), the counter clear clutch mechanism will not be activated.

When the lever 170 is forward, link 171 is positioned so that blocking surface 171A in link 171 is in the path of stud 172A on lever 172. When automatic lever 655 is activated as a result of the toggle assembly being unlatched, lever 172, being spring urged CCW, is not permitted to rock due to blocking surface 171A restraining the lever at stud 172A. Therefore, link 409 is not disengaged from stud 415 on lever 417 and automatic clearance of the upper dial is permitted to be carried out.

The above described mechanism will still permit clearance of the upper dial in a division problem in the same manner as shown and described in the aforementioned manual at page 94, FIGURE 110 thereof. However, the clearance disabling mechanism for the upper dial shown on page 55, FIGURE 55 of said manual, has been changed. The upper dial clearance disabling lever 175 is now provided with a stud 175A on the lower end thereof. Link 171 has a stud 171D on the lower end which engages and lifts stud 175A on lever 175 when lever 170 is moved to the rearward position. The stud 175A will also contact and lift link 176 to remove surface 176A at the rear of the link from the path of stud 177A on the upper dial reverse arm 177. Thus when the arm 177 rotates CW at the beginning of a division operation, the upper dial will not be cleared.

Clearance of the upper dial when the clear return key 110 is depressed will be activated (regardless of the position of lever 170) because automatic clearance lever 655, being in a restored position, blocks lever 172 in a down position through stud 172B. Therefore, link 409 will not be disengaged from stud 415 on lever 417. Similarly, clearance of the upper dial by the upper dial manual clear key will not be affected by the position lever 170.

It is to be understood that the construction shown is for purposes of illustration and that variations may be made therein without departing from the spirit and scope of the invention as defined by the claims.

The invention claimed is:
1. A calculating machine having
   (1) a result register comprising a plurality of numeral wheels,
   (2) a plural order keyboard,
   (3) means for locking the keys in depressed position,
   (4) value entry means settable in value representative positions in accordance with the value of the keys depressed,
   (5) and numeral wheel actuators selectively operable for a single or a plurality of cycles of actuation under the control of said value entry means,
the combination of means responsive to the initiation of a plural cycle actuation comprising:
   (a) a mechanism for locking the value entry means in said value representative position,
   (b) a device to unlock the depressed keys
   (c) and means to establish a connection between the unlocked mechanism for the value entry means whereby the subsequent depression of key releases the value entry means from said locking mechanism.

2. A calculating machine as defined in claim 1, having a numeral wheel resetting mechanism, a connecting means between the keyboard and the resetting means and in which said subsequent depression of any key initiates the operation of the resetting means.

3. A calculating machine as defined in claim 2 including means responsive to the initiation of a single cycle of actuation for disabling the connection between the keys and the resetting initiating means.

4. A calculating machine as defined in claim 1, having a register shifting mechanism, a connecting means between the keyboard and a shift mechanism initiating means and in which said subsequent depression of any key initiates the operation of the shifting mechanism.

5. A calculating machine as defined in claim 4 including means responsive to the initiation of a single cycle of actuation to disable the connection between the keys and the shift initiating means.

6. A calculating machine as defined in claim 1, including means responsive to the initiation of a single cycle of actuation for preventing the operation of the value entry locking mechanism.

7. In a calculating machine having
   (1) a result register comprising a plurality of numeral wheels,
   (2) resetting means for the numeral wheels,
   (3) a plural order keyboard,
   (4) means for locking he keys in depressed position, and
   (5) numeral wheel actuators selectively operable for a single or a plurality of cycles of actuation,
the combination of means responsive to the initiation of a plural cycle actuation comprising:
   (a) a device to unlock the depressed keys
   (b) and means to establish a connection between the unlocked keys and the resetting means whereby the subsequent depression of any key automatically initiates the operation of the resetting means.

8. A calculating machine as defined in claim 7 including selectively settable means to disable and enable said automatic initiation of operation of the resetting means.

9. A calculating machine as defined in claim 7 including means responsive to the initiation of a single cycle of actuaton for preventing the operation of the resetting initiating means by any of the keys.

10. In a calculating machine having
   (1) a result register,
   (2) a plural order keyboard,
   (3) means for locking the keys in depressed position,
   (4) numeral wheel actuators selectively operable for a single or a plurality of cycles of actuation, and
   (5) means for shifting the result register relative to the actuators,
the combination of means responsive to the initiation of a plural cycle operation comprising:
   (a) a device to unlock the depressed keys,
   (b) and means to establish a connection between the unlocked keys and the shifting mechanism whereby the subsequent depression of any key initiates the operation of the shifting mechanism.

11. A calculating machine as defined in claim 10 including means responsive to the initiation of a single cycle of actuation to prevent the operation of the shifting mechanism by any of the keys.

12. A calculating machine for performing a two-step multiplication operation having:
   (1) A result register,
   (2) Means operatively associated with said machine for clearing a value from said result register,
   (3) A first keyboard,
   (4) Means operatively associated with and responsive to the depression of a value key on said first keyboard for entering a multiplicand value into said machine,
   (5) A second keyboard,
   (6) Means operatively associated with and responsive to the depression of a value key on said second keyboard for entering a multiplier value into said machine,
   (7) Means operatively associated with and responsive to the entry of said multiplier value for automatically performing a multiplication operation, entering the product on said result register, and automatically clearing said first keyboard of all previous values entered, and
   (8) Means operatively associated with and responsive to the depression of any key on said first keyboard subsequent to the completion of the multiplication operation for initiating operation of said result register clearing means.

13. A calculating machine as defined in claim 12, including means to disable and enable said means for initiating operation of said result register clearing means.

14. A calculating machine as defined in claim 12, including a counter register, counter register clearing means, and means responsive to the depression of any key on said first keyboard subsequent to the completion of the multiplication operation for initiating operation of said counter register clearing means.

15. A calculating machine as defined in claim 14, including means to disable and enable the operation of said product register clearing means independently of said counter register clearing means.

16. A calculating machine as defined in claim 14, including means to disable and enable the operation of said initiating means for said counter register clearing means independently of said product register clearing means.

17. A calculating machine as defined in claim 12, having means operatively associated with said machine for shifting said result register, and means operatively associated with and responsive to the depression of any key on said first keyboard subsequent to the completion of a multiplication operation for automatically initiating operation of said result register shifting means.

References Cited
UNITED STATES PATENTS

| | | | |
|---|---|---|---|
| 1,906,063 | 4/1933 | Hilder | 235—82.5 |
| 2,046,820 | 7/1936 | Hilder | 235—79 |
| 2,294,948 | 9/1942 | Avery | 235—145 |
| 2,377,767 | 9/1945 | Dustin et al. | 235—63.22 |
| 2,636,678 | 4/1953 | Matthew | 235—63.2 |

STEPHEN J. TOMSKY, *Primary Examiner.*

RICHARD B. WILKINSON, *Examiner.*

STANLEY A. WAL, *Assistant Examiner.*